United States Patent
Zhou et al.

(10) Patent No.: US 9,477,425 B1
(45) Date of Patent: *Oct. 25, 2016

(54) MANAGING OBJECT DELETION

(75) Inventors: Feng Zhou, Framingham, MA (US);
Russell R. Laporte, Webster, MA (US);
Jingyan Zhao, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1200 days.

This patent is subject to a terminal disclaimer.

(21) Appl. No.: 12/411,802

(22) Filed: Mar. 26, 2009

(51) Int. Cl.
G06F 9/44 (2006.01)
G06F 3/06 (2006.01)
G06F 17/30 (2006.01)

(52) U.S. Cl.
CPC ........... G06F 3/0652 (2013.01); G06F 3/0643 (2013.01); G06F 17/30117 (2013.01)

(58) Field of Classification Search
CPC .............................. G06F 17/30595; G06F 9/44
USPC ....................................................... 717/106
See application file for complete search history.

(56) References Cited

U.S. PATENT DOCUMENTS

| | | | | |
|---|---|---|---|---|
| 5,185,885 A | * | 2/1993 | Dysart et al. ................. | 707/822 |
| 5,692,184 A | * | 11/1997 | Ardoin et al. ................ | 700/182 |
| 6,567,818 B1 | * | 5/2003 | Frey ........................ | G06F 9/465 |
| | | | | 707/694 |
| 7,143,108 B1 | * | 11/2006 | George | |
| 7,206,863 B1 | * | 4/2007 | Oliveira et al. .............. | 709/245 |
| 7,401,137 B1 | * | 7/2008 | Gasser et al. ................. | 709/223 |
| 7,447,709 B1 | * | 11/2008 | Rozenman et al. | |
| 7,577,681 B1 | * | 8/2009 | Rozenman ........ | G06F 17/30595 |
| 7,603,366 B1 | * | 10/2009 | Gritsay et al. | |
| 7,606,811 B1 | * | 10/2009 | Rozenman et al. | |
| 7,620,720 B1 | * | 11/2009 | Gasser ........................ | 709/226 |
| 7,631,155 B1 | * | 12/2009 | Bono .................... | G06F 3/0608 |
| | | | | 707/999.202 |
| 7,685,368 B1 | * | 3/2010 | Fickie et al. .................. | 711/133 |
| 7,711,705 B1 | * | 5/2010 | Patsenker et al. ............ | 707/613 |
| 2003/0093509 A1 | * | 5/2003 | Li et al. ....................... | 709/223 |
| 2004/0064458 A1 | * | 4/2004 | Hagarty ....................... | 707/100 |
| 2006/0212673 A1 | * | 9/2006 | Fukuguchi ............. | G06F 3/0605 |
| | | | | 711/173 |
| 2010/0191708 A1 | * | 7/2010 | Brixius ............. | G06F 17/30117 |
| | | | | 707/662 |

* cited by examiner

Primary Examiner — Wei Zhen
Assistant Examiner — Brahim Bourzik
(74) Attorney, Agent, or Firm — Krishnendu Gupta; Daniel P. McLoughlin

(57) ABSTRACT

A method is used in managing object deletion. Updated information about a system is repeatedly polled for. An information set is received identifying an object to be deleted from a system management model that is descriptive of the system. An iterative process is applied to determine other objects in the system management model that are unidentified in the information set and that are affected by deletion of the object. The object is deleted.

19 Claims, 8 Drawing Sheets

START CONFIGURATION: ARRAY CONNECTS TO 2 HOSTS

END CONFIGURATION: CONNECTION BETWEEN ARRAY AND HOST-2 IS REMOVED. ARRAY CONNECTS TO 1 HOST

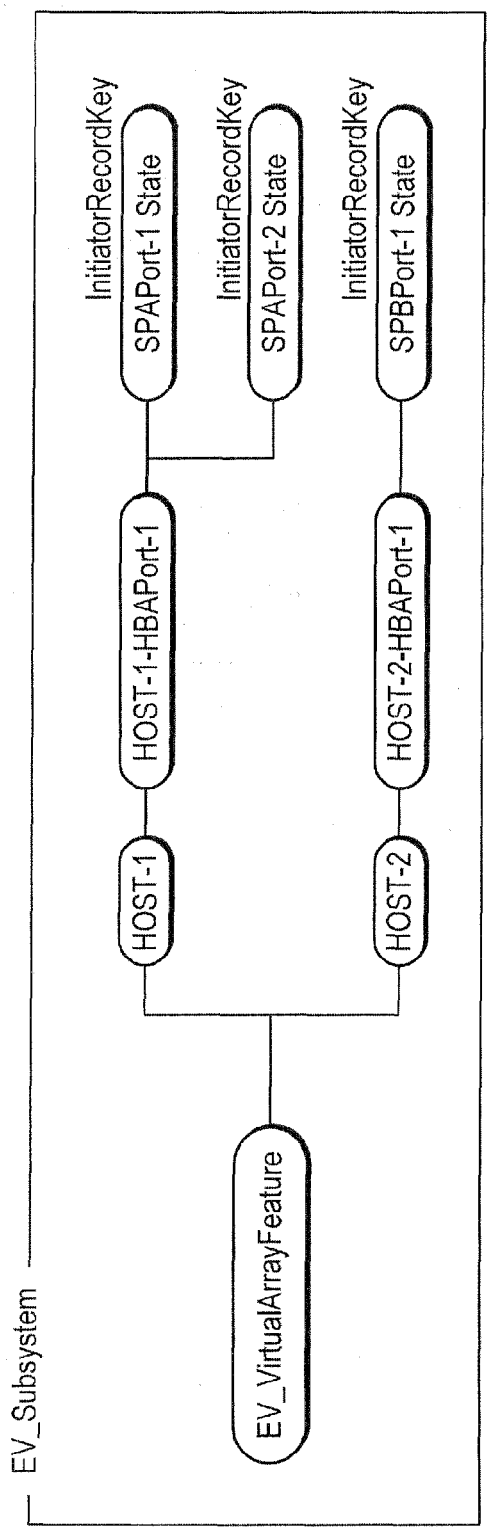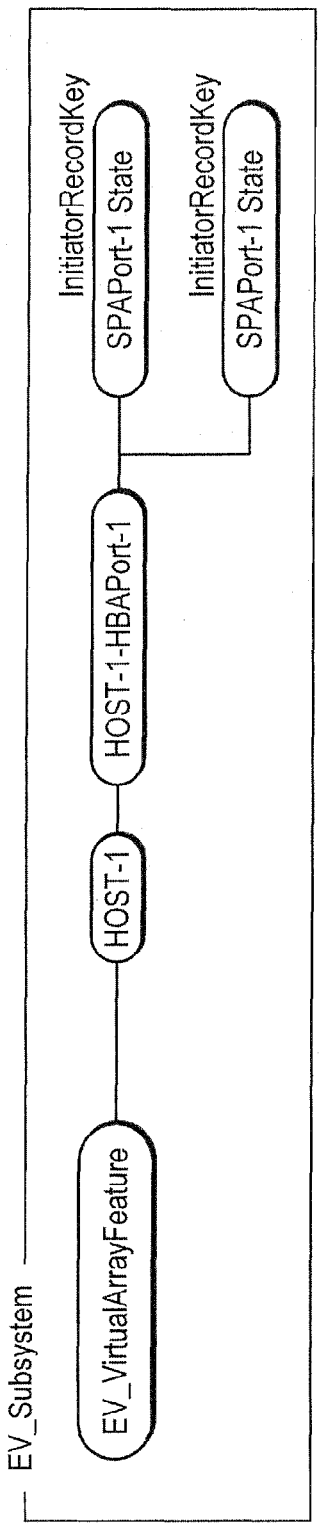
FIG. 6A
NAVI RAID++ OBJECTS FOR THE START CONFIGURATION: ARRAY CONNECTS TO 2 HOSTS
FIG. 6B
NAVI RAID++ END CONFIGURATION: CONNECTION BETWEEN ARRAY AND HOST-2 IS REMOVED. ARRAY CONNECTS TO 1 HOST

MANAGING OBJECT DELETION

BACKGROUND OF THE INVENTION

1. Field of the Invention

The present invention relates to managing object deletion.

2. Description of Prior Art

Client-server computer storage configurations or networks are well known. The "client" (human user, or graphical user interface (GUI), or workstation, etc.) is operatively coupled to hardware/software functionality known as the "server" which services the client by responding to client requests to store information and/or retrieve stored information. Multiple clients can be operatively coupled to multiple servers in a particular client-server network configuration.

Effective management of client-server networks is very important to ensure that the networks operate as intended and serve network users as expected. This management function may be accomplished through distributed management software which can be distributed throughout a client-server network. If a client-server network is running such software that is also object-oriented, typically many objects reside in each of the clients and/or servers. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor each object may describe or relate to a specific tangible detail in the processor (e.g. a fan, power switch, cache memory, power supply, disk drive interface, etc.). These tangible objects in the storage processor can send messages to each other and to other objects outside the processor such as a disk array.

In management software running within its client-server environment, there may be a group of service providers termed "providers", which are delegated specific managerial tasks to perform within the distributed management software of the client-server system, i.e. they are delegated specific services to "provide". In a CLARiiON® storage system marketed by EMC Corporation, such providers may include: directory provider, persistence (file replication) provider, security provider, snapshot copying (backups and data modeling) provider, mirroring (permanent backup storage) provider, clone (local replication) provider, LUN provider (creates or destroys LUNs), meta LUNs (virtualization) provider, etc. Each provider is concerned only with performing its own prescribed task. These providers are, of course, software entities, but they may be modular in design. They can, therefore, be modularly "plugged" into a software framework allowing easily-made additions to, or reductions of, the overall functionality of the storage system's management software. These providers act upon objects and although each provider is concerned with performing only its own task, it may act upon one or more objects that are also being acted upon by other providers. Thus, there may be dependency or interaction, albeit unwanted, between certain providers because of objects which are common to those certain providers. The various providers acting upon the same object may have conflicting goals or purposes for that same object.

SUMMARY OF THE INVENTION

A method is used in managing object deletion. Updated information about a system is repeatedly polled for. An information set is received identifying an object to be deleted from a system management model that is descriptive of the system. An iterative process is applied to determine other objects in the system management model that are unidentified in the information set and that are affected by deletion of the object. The object is deleted.

BRIEF DESCRIPTION OF THE DRAWINGS

FIGS. 6A-6B are illustrations of aspects of one or more example data structures that may be used with the invention.

DESCRIPTION OF THE PREFERRED EMBODIMENTS

Described below is an object management technique that can be used in an automated method of accounting for related objects during an object deletion exercise. The deletion of objects can be automated in a manner that addresses not only the direct impact of the deletion of the managed content itself, but also the indirect impact the deletion has on other objects in the managed object environment. Managed objects are maintained in an environment in which relationships in the form of hierarchies and dependencies are formed between objects to allow client software to represent the managed objects in a comprehensive manner. Therefore, helping to assure a consistent and meaningful relationship matrix between managed objects is useful to the overall management experience, and at least one implementation of the technique streamlines and validates the maintenance of these relationships when managed objects are removed from a system.

Conventionally, if a managed object is deleted in a manner that does not take into account its relationship to other managed objects, the effect is "holes" and "loose ends" in the hierarchy that can adversely affect the overall management experience. Conventionally, it is up to the developer of the object removal code to account for these relationships and clean up in an appropriate manner and this can lead to issues in which not all relationships are accounted for or the clean up is not done in an order to assure the sanctity of the relationships.

At least one implementation in accordance with the object management technique described herein can provide consistent, automated relationship recognition, and appropriate processing taking into account managed object hierarchies including parent/child and peer relationships and rules to maintain a meaningful object hierarchy. At least one implementation in accordance with the object management technique described herein automates the deletion of a managed object by enforcing the rules with a "prune" and "purge" methodology built into the process, and helps reduce human error.

Figure 1:
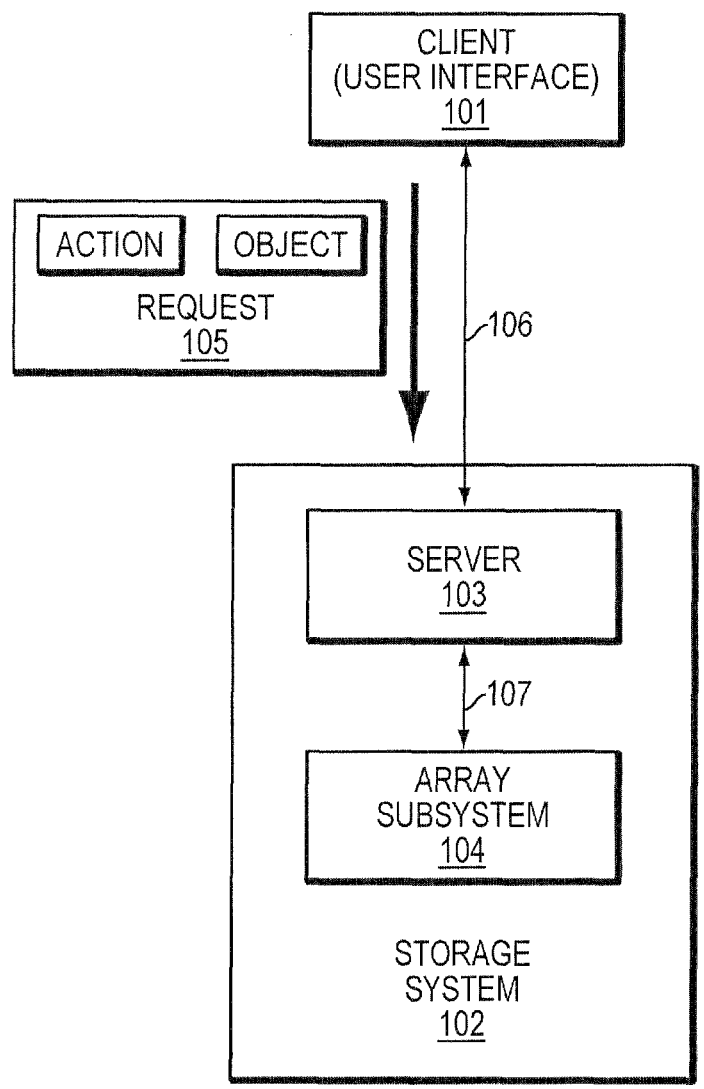
FIGS. 1-5B are illustrations of aspects of one or more example computer systems that may be used with the invention.

FIG. 1 is an exemplary block diagram of a typical client-server storage network which may be enhanced by incorporating therein embodiments of the present invention (embodiments not shown in FIG. 1). Client 101 may be a typical workstation or graphical user interface (GUI) operatively coupled to storage system 102 which may be, for example, similar to those manufactured by EMC Corporation, the assignee of the present invention. This coupling can be achieved via link 106 which can be, for example, a hyper text transfer protocol (HTTP) link. Storage system 102 includes management server 103 operatively coupled to array subsystem 104 by way of link 107 which can be, for example, an IOCTL protocol link (IOCTL means Input/Output Control, which is a well known protocol or special application programmers' interface for passing messages between software processes). Server 103 receives input requests, such as request 105, from Client 101 and serves-up responses to those requests from array subsystem 104. Request 105 can be coded in, for example, XML language. Array subsystem 104 may be a typical RAID configuration. Client request 105 is shown containing an action and an object, and is intended to represent a request or command by client 101 to take that specific action upon that specific object.

Requests, such as request 105, from client 101, may be honored or responded to. In general, with reference also to FIG. 2 described in more detail below, each of the providers 204-206 is software functionality which acts independently on its own set of objects. For example, a provider may act on a set of LUNs and may know only about its own set of objects or LUNs, but sets of objects for different providers may intersect. Every object initially belongs to one and only one provider, but each object can be referenced by more than one provider, and in that sense, can belong to more than one provider. In other words, each provider can grow its set of objects by extending its domain, or sphere of influence, over objects that initially belonged only to other providers. Every provider can perform operations on all of the objects in its set, regardless of whether that object was in its set initially or resulted from an extension of its domain.

Figure 2:
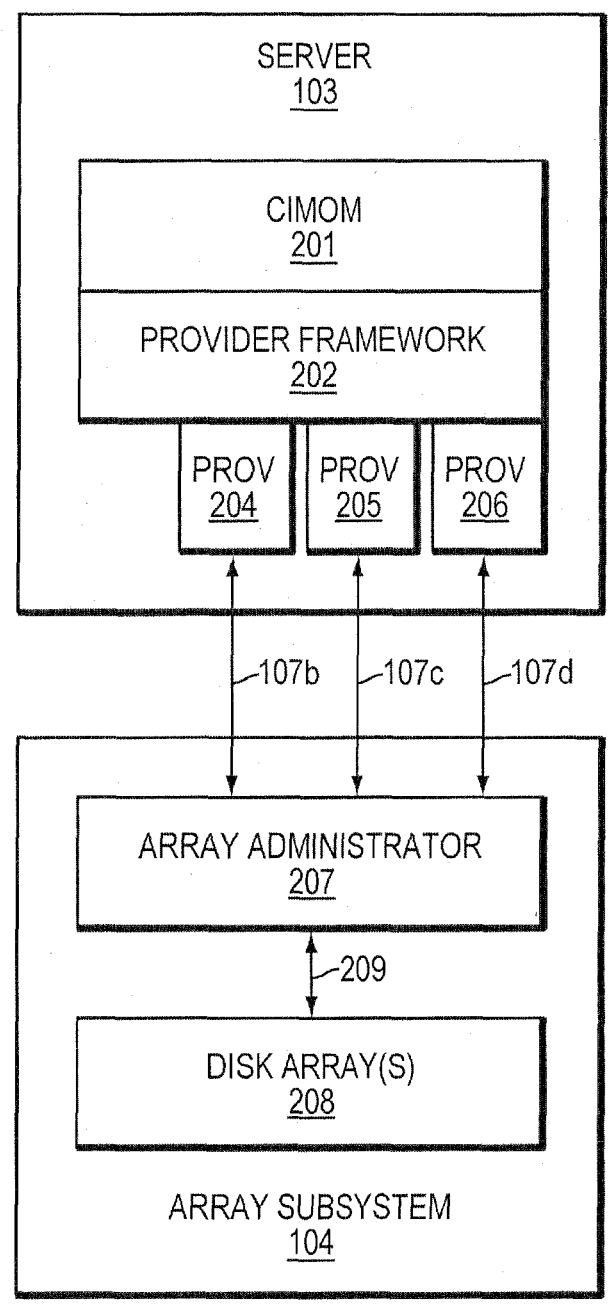

FIG. 2 is an exemplary block diagram of a storage system reflecting embodiments of the present invention. Server 103 includes CIMOM 201, provider framework 202 and a number of providers 203-206. It should be understood that many more, or fewer, providers can be used. Array subsystem 104 includes an array administration interface or array administrator 207 and disk array(s) 208. CIMOM 201 is an object manager configured in accordance with the Storage Network Industry Association Common Information Model (SNIA/CIM) standard or protocol and receives requests such as request 105 from client 101. CIMOM 201 provides a framework for services offered by providers that plug into it, such as provider framework 202 with which it is operatively coupled. A provider is a plug-in into the CIMOM that provides a specific service, such as managing a storage feature.

Providers 203-206 may be implemented as dynamic link libraries (DLLs) loaded into the CIMOM process. Accordingly, they can "plug in" to provider framework 202 in a modular fashion and are thereby communicatively coupled to CIMOM 201. The providers may also be communicatively coupled to each other through CIMOM 201. Providers 204-206 may be removed, depending on whether or not their functionality is essential for operation of the system and others (not shown) may be added by plugging-in to framework 202.

Array administrator or administration interface 207 is the interface through which all storage system management is performed, regardless of which array feature or driver may be targeted. Providers 203-206 are communicatively coupled by way of inter-process communication links 107a-107d to array administration interface 207. Thus, on the client side of the interface, it may be accessed using application programmer interface (API) calls. On the array side of the interface it may use IOCTL calls to communicate with the managed drivers. Link 209 operatively couples array administrator 207 to disk array(s) 208 which, therefore, can be an IOCTL link.

Figure 3:
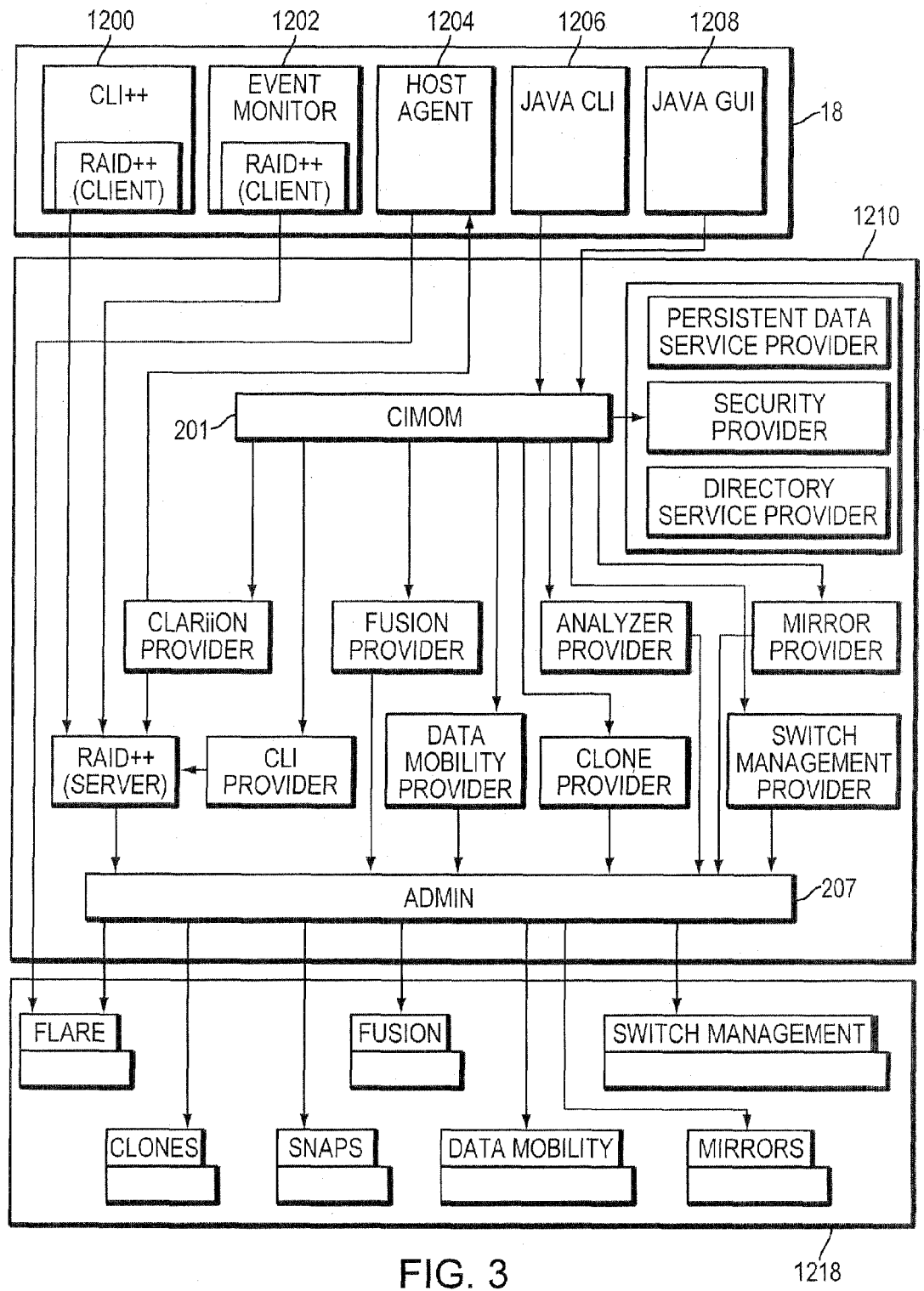

FIG. 3 illustrates a more detailed example of the arrangement described in FIGS. 1-2 showing location and relationships of components to each other. The components may use various communications methods and protocols. The following describe the function of each of the major components and their interfaces to associated functions.

Several components of system management reside on host computers and are referred to as client components and are shown in group 18. One component in particular, Raid++, has both a client and server instance, shown respectively in host/client group 18 or server group 1210. Other components include the C++ Command Line Interface CLI 1200, the Java CLI 1206, the Java GUI 1208, the Host Agent 1204, and the Event Monitor 1202.

The server side management components shown in group 1210 interact with the user interfaces and tools for administering the system configuration and operation and to report on system operation. The server side components are comprised of middleware which resides between the user and the storage management components of the system which implement management system storage features. The server side components are basically divided into two groups, the legacy Raid++ module which provides the majority of the management services and the CIMOM and its providers. The Raid++ module uses a proprietary transport to communicate with management clients such as the CLI++. The Raid++ module maintains an object model of the system that it uses for managing the system; it updates the model repeatedly (e.g., periodically) by polling the system as described in more detail below. The CIMOM CLARiiON Provider is essentially a wrapper for the Raid++ classes and methods and translates GUI initiated CIM XML commands into calls to Raid++ to fulfill requests.

(With reference to FIG. 3, in at least some implementations, the CLI provider interacts with multiple providers, such as CLARiiON Provider, instead of with RAID++ directly.)

The management functions not provided by Raid++ are provided by the series of CIMOM providers which are attached to a CIMOM. The CIMOM provides common infrastructure services such as XML coding/decoding and HTTP message transport. The hosted services exclusively implemented in CIMOM providers are: Analyzer Provider—Provides statistics about performance of traffic on ports on the switch; CLI Provider—This provider implements services to allow CLI clients to access CIM managed services such as Clone, Analyzer, Fusion, and switch management; Clone Provider—Provides services to manage the configuration and operation of clones; Data Mobility Provider (e.g., SANCopy provider)—Provides services to manage the configuration and operation of data migration between storage volumes transparently to the host applications using the storage; Fusion Provider—Provides services to configure and manage the combining of LUNs to create new LUNs of larger capacity; Mirror Provider—Provides services to manage the configuration and operation of mirrors; and. Switch Management Provider—Provides services to configure and manage the attached intelligent switch components.

The above-described providers periodically poll the system infrastructure to build and update a model of the existing component configuration and status. If any changes are detected in configuration or status from the existing model, registered observers are notified of the changes and the model is updated with the new model and saved for queries by the provider. The services of these providers can be accessed from other providers by formulating XML requests and sending them to the CIMOM. This permits providers which require the services of other providers (such as Raid++ through the CLARiiON Provider or the CIM local services such as persistent storage, directory services, or security) to access those services. Additionally Admin STL Driver Access through the server side provides access to these providers to the drivers and services of an SP as shown in group 1218, including to the following drivers: Flare, Clones, Snaps, Fusion, and mirrors and services for switch management and data mobility.

Other Service Providers are shown in group 1212 of the server group 1210, and include the Persistent Data Service Provider, Security Provider, and Directory Service Provider. A purpose of the Persistent Data Service Provider is to assure that any data written to its own file mechanism is propagated to all nodes in the management system domain, including its peer storage processor SP, and this interaction is performed via network requests.

The Security Provider supports authentication of users and authorization of user roles. The Directory Service Provider is used to obtain the network addresses of the systems in a domain of managed system management instances.

Figure 4:
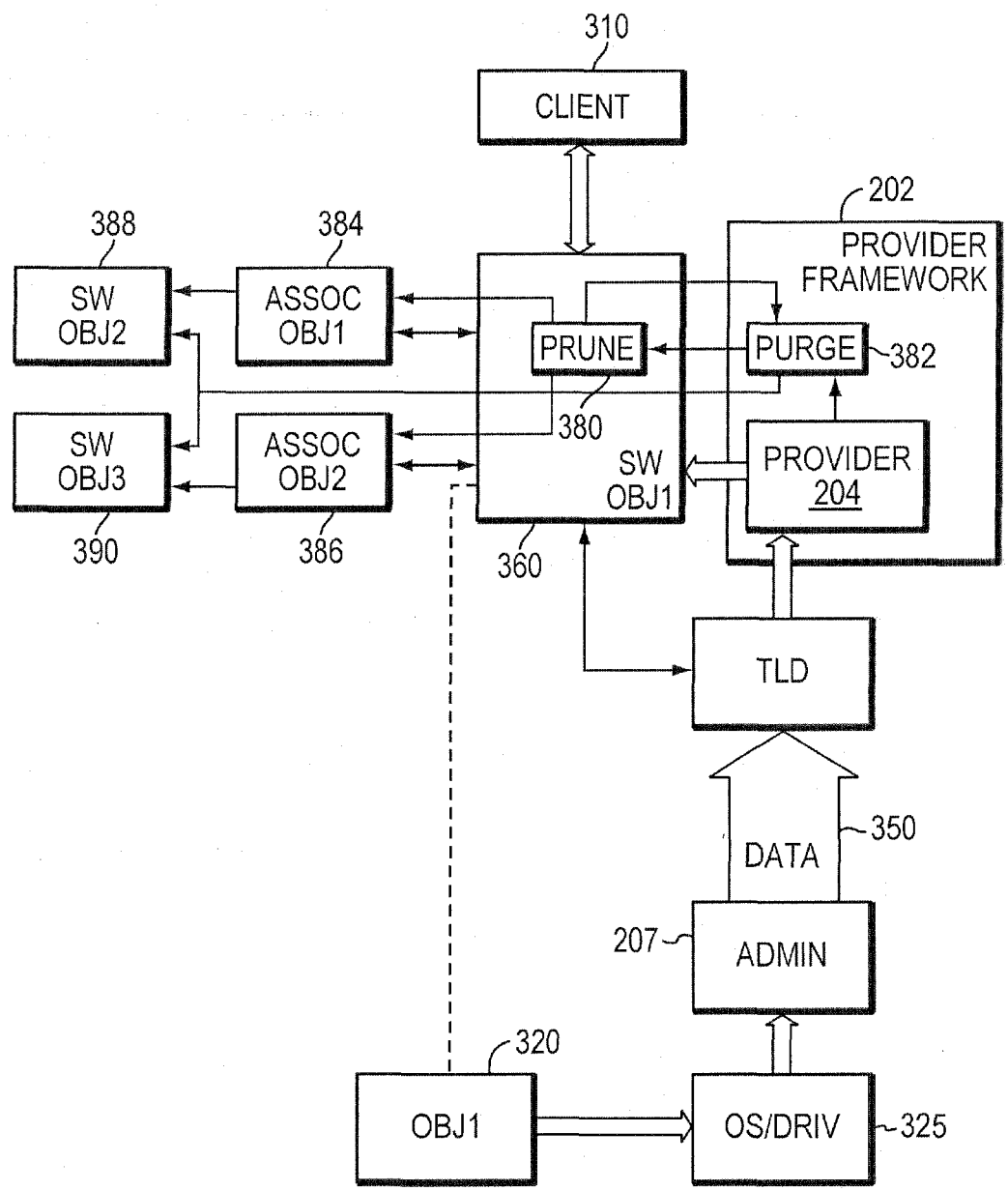
Figure 5A:
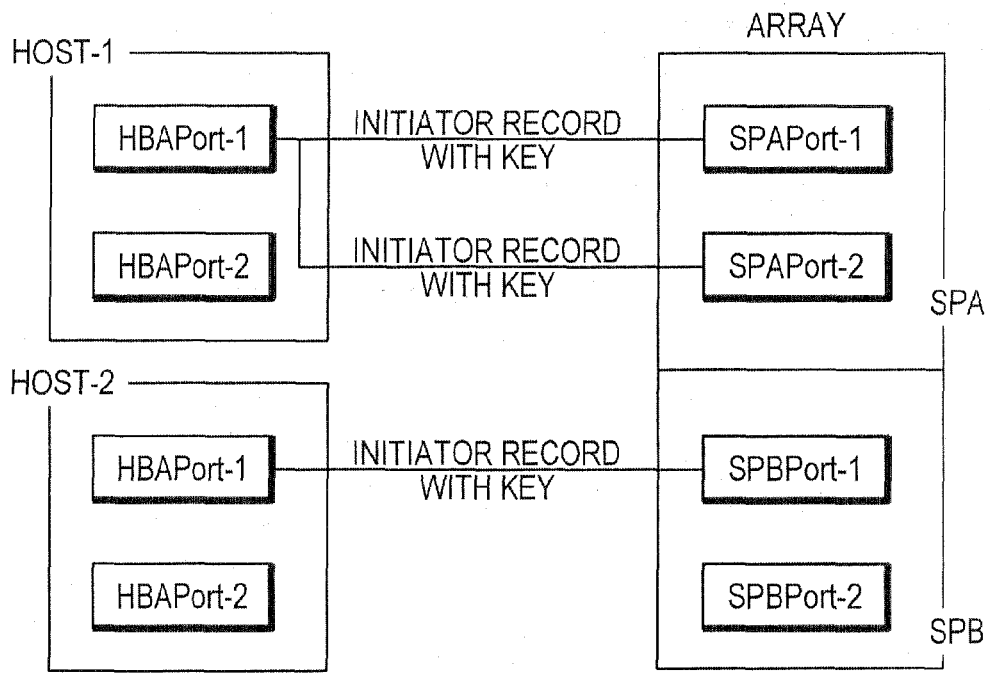
Figure 5B:
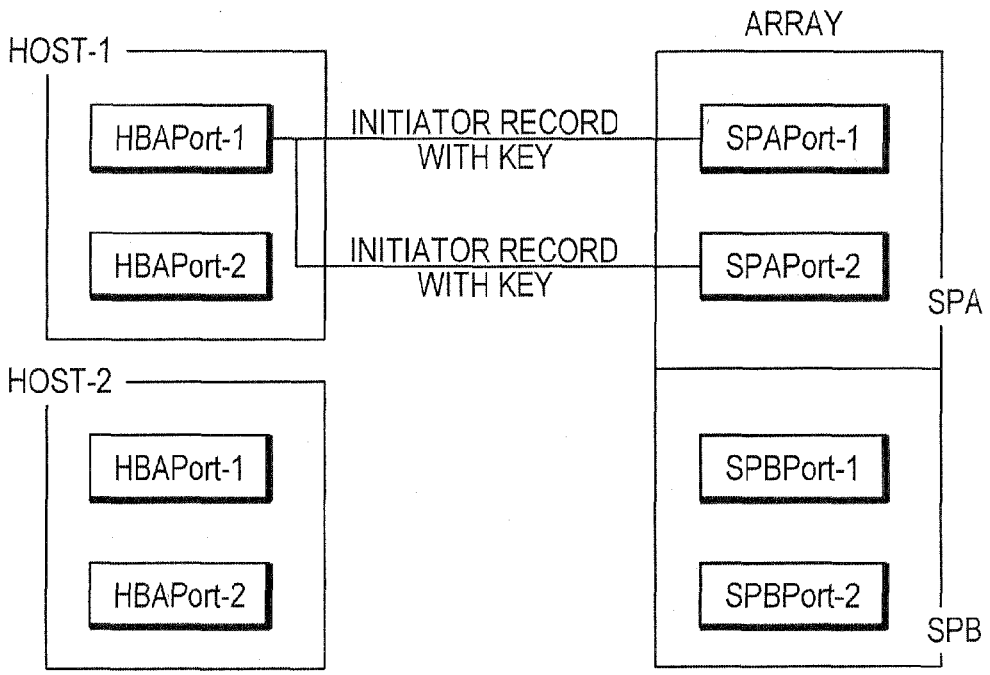

FIG. 4 illustrates aspects of at least one implementation of the object management technique regarding the CIMOM providers. All or a portion of operating system/driver 325 may be, include, or be included in one or more of group 1218. Managed object OBJ1 320 may be or include any managed object (physical or logical object) in the system (e.g., disk, LUN).

As shown in FIG. 4, through operating system/driver 325, array administration interface 207 ("admin software") receives property data pertaining to object 320. Admin software 207 makes information derived from such property data available to provider 204. When client software 310 needs property data pertaining to object OBJ1 320, client software 310 makes a request to software object (also referred to as descriptor object) SW OBJ1 360 which represents object 320.

Initially, software object 360 is created by provider 204 based on polled data 350 provided by admin software 207 to provider 204 for object 320. In at least one implementation, software object 360 includes a key supplied by data 350 that identifies object 320, and data 350 is presented by admin software 350 in tag length data (TLD) format to provider 204. If data 350 also indicates that object 320 is associated with one or more other objects (not shown), corresponding other software objects (e.g., SW OBJ2 388 and SW OBJ3 390) are created if necessary, and association objects (e.g., ASSOC OBJ1 384 and ASSOC OBJ2 386) are created to reflect the associations. One or more of the other software objects may in turn be associated with further software objects, and so on, in a cascading fashion. Software object 360 has information indicating, for each of the other software objects to which it is directly linked by association objects, whether the software object belongs to ("is owned by") software object 360 such that it should not exist if software object 360 ceases to exist.

Data 350 is refreshed repeatedly, and if data 350 indicates to provider 204 that object 320 has been deleted, the following process is executed in accordance with the object management technique to update software objects to reflect the deletion. Provider 204 invokes a purge operation 382 of provider framework 202, and directs the purge operation to software object 360. This purge operation ("original purge operation") invokes a prune operation of software object 360 ("original prune operation"), which executes as described below. Once the prune operation completes, the purge operation deletes software object 360 and its association objects (e.g., association objects 384, 386).

In the prune operation, for each software object owned by software object 360, another instance of the purge operation is invoked and is directed to such software object (e.g., software object 388). The prune operation does not invoke other instances of the purge operation for software objects not owned by software object 360 (e.g., software object 390).

The corresponding purge operation may in turn cause invocation of one or more other instances of the prune operation, depending on whether a software object owned by software object 360 also owns one or more further software objects, and so on.

Once all of the other instances of the purge and prune operations complete, the original prune operation completes, and control is returned to the original purge operation, which executes further as described above.

In a particular example, software object 360 represents object 320 which is an instance of data mobility functionality, here a session for copying a LUN, software object 388 represents its destination and is owned by software object 360, and software object 390 represents a source LUN and is not owned by software object 360. When provider 204 determines from data 350 that object 320 has been deleted, the process described above executes, with the end result that software objects 360, 388 are deleted and association objects 384, 386 are deleted.

Thus, in a deterministic way, before a software object is deleted, its information about other software objects it owns and its specific prune operation are used to clean up the model to reflect the deletion.

In at least one embodiment, each time data 350 is refreshed (e.g., periodically), it passes to each provider a respective deleted objects list which lists objects pertaining to such provider that have been deleted since the previous refresh. The deleted object list includes keys for the corresponding software objects that should be removed.

In at least one embodiment, the deleted objects list is processed in same order in which a poll is usually performed (e.g., software objects representing LUNs are deleted before a software object representing the storage group that contains the LUNs is deleted).

FIGS. 5-8 illustrate aspects of at least one implementation of the object management technique regarding the Raid++ module. For each type of object (e.g., LUN or storage group or RAID group), a respective overarching parent object manages all objects of such type, which constitute its children objects, and keeps a list of pointers to such children objects. Only low-level, primitive objects (e.g., representing initiator records as described below) are identified to the Raid++ module by the admin software in its poll response. The Raid++ module uses built-in knowledge about data storage configuration to derive the rest of its objects (e.g., representing hosts) from the primitive objects, and to derive its model generally based on association information in the poll response.

In a previous system status updating scheme, the Raid++ module received in each poll response a complete set of information for all primitive objects, from which the Raid++ module built a new, temporary, complete, second, parallel set of parent objects. In such cases, the poll response did not explicitly identify deleted objects, but the Raid++ module could detect which objects had been deleted since the previous poll response by comparing the new set of parent objects to the existing set of parent objects. In the previous scheme, for each parent object, any child objects listed by an existing parent object but not listed by the corresponding new parent object were removed from the existing parent object.

In a current system status updating scheme, after a full set of parent objects is initially built in a top down fashion (e.g., from host down to SPA port to initiator record), the Raid++ module receives, from the admin software in each poll response, object type and object key information for changed and deleted objects only. To update the full set of parent objects in accordance with the deleted objects, the Raid++ module proceeds as follows, using a new virtual function (DeletedObject) provided in each parent object to process the removal of a child object based on the key and to clean up other objects that may need to be removed as a result of no longer being able to reference the child object that was removed.

The Raid++ module builds a hash table from the object type and object key information to allow each parent object to determine quickly, by using object type as the hash key, which of its most fundamental child objects is affected by the deletion. The parent object removes such child object and also removes any other child objects that should no longer exist absent a reference to the child object that was removed.

FIGS. 5-8 illustrate an example involving the Raid++ module. FIG. 5A illustrates that each connection between a storage system (array) and hosts is represented by a respective initiator record having a key wherein the record describes a connection between a storage processor port (SPAPort or SPBPort) of the array and a host bus adapter port (HBAPort) of the host. FIG. 6A illustrates that an EV_VirtualArrayFeature parent object has child objects Host-2 representing the host, Host-2-HBAPort-1 representing the host's HBAPort, and SPBPort-1 representing the state of the array's storage processor port, all constructed based on the initiator record key which is referenced by child object SPBPort-1. FIGS. 5B, 6B illustrate that when the connection terminates, the Raid++ module cleans up as described herein to remove not only the SPBPort-1 object but also the Host-2-HBAPort-1 and Host-2 objects.

Figure 7:
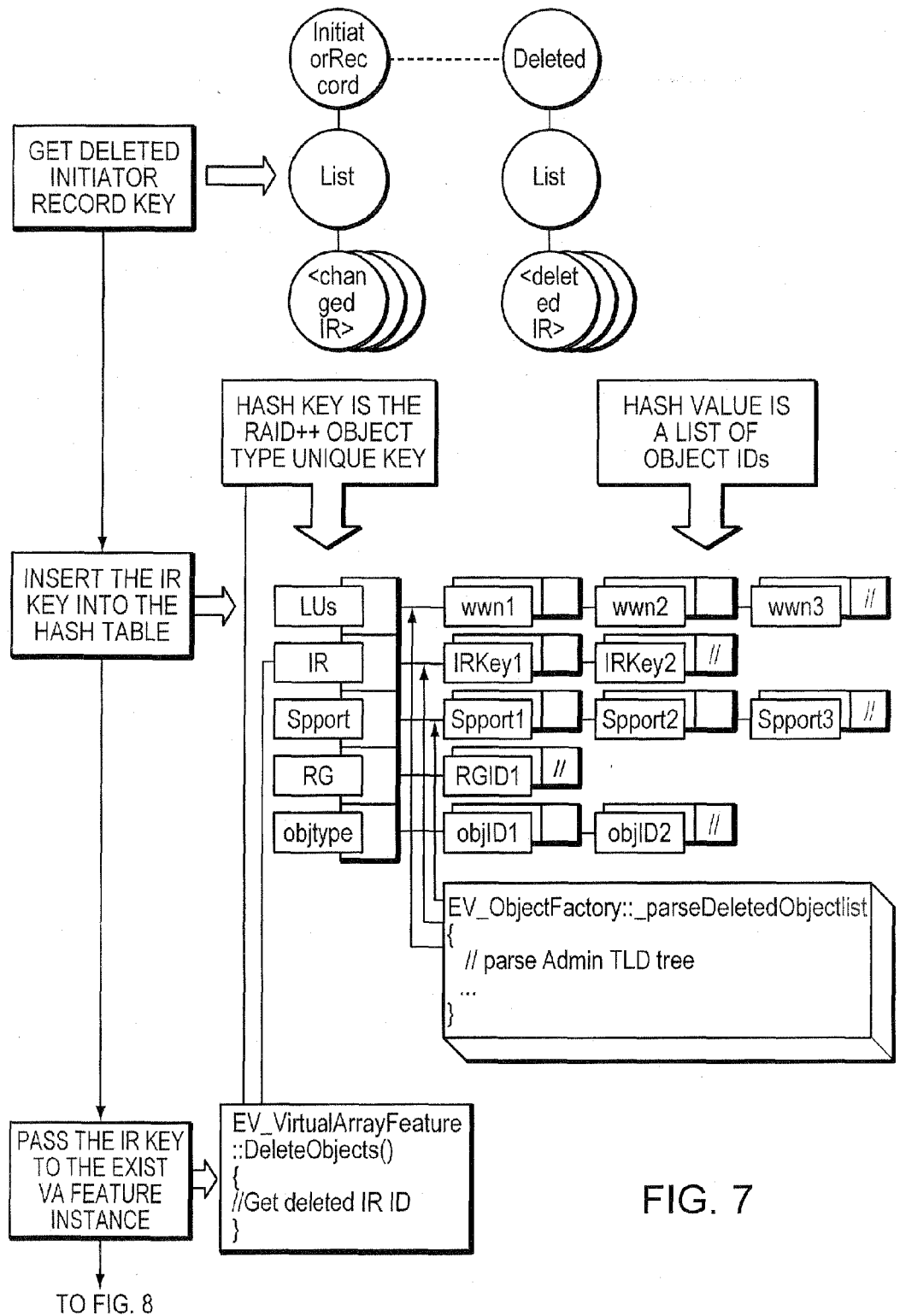
FIGS. 7-8 are illustrations of aspects of one or more example procedures that may be used with the invention.

As illustrated in FIG. 7, when the connection terminates, the next poll response from the admin software includes object type and object key information identifying the initiator record as a deleted item. The hash table is constructed so that the object key is returned when the EV_VirtualArrayFeature parent object processes the hash table using its object type as the hash key to determine object keys having pertinence to child objects of the EV_VirtualArrayFeature parent object.

Figure 8:
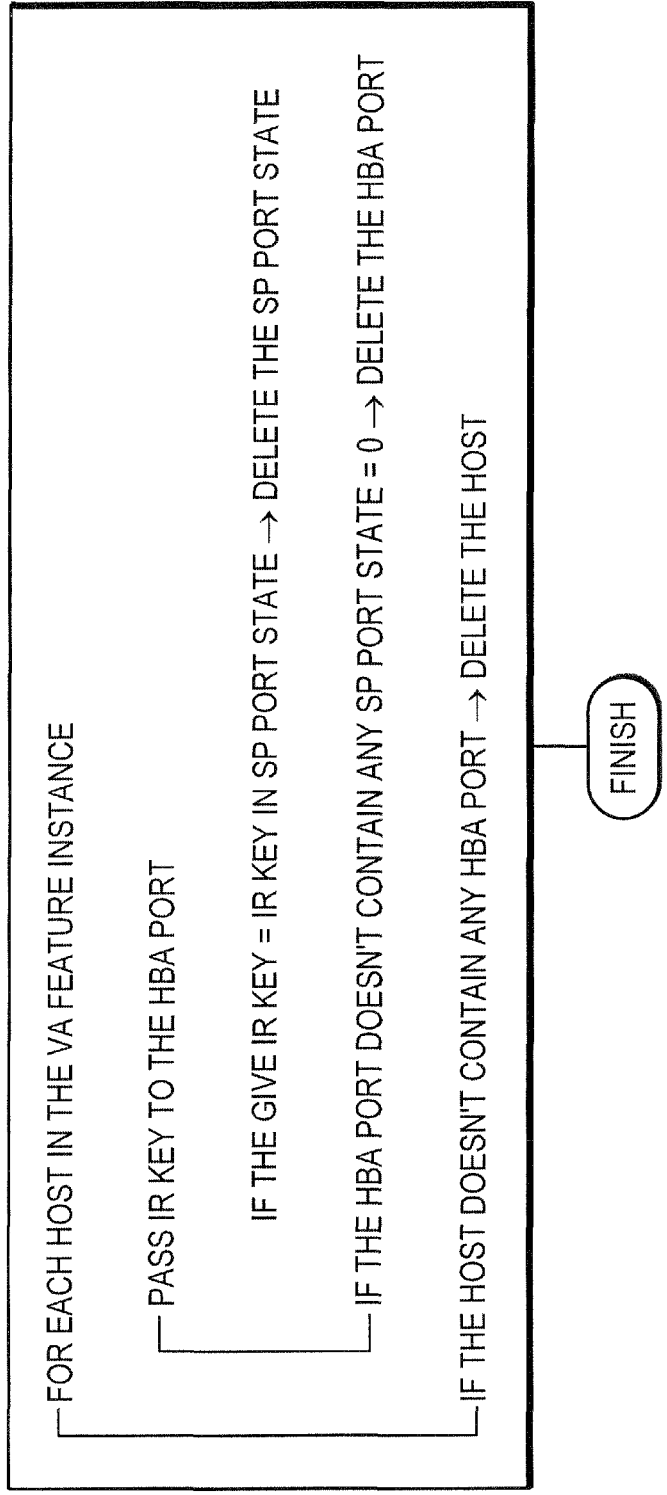

As illustrated in FIG. 8, the EV_VirtualArrayFeature parent object deletes object SPBPort-1 because it references the initiator record key. Next, the Host-2-HBAPort-1 object is deleted because SPBPort-1 was the only SPBPort state object it referenced, and then Host-2 is deleted because the Host-2-HBAPort-1 object was the only HBAPort it referenced.

Various computer systems in which implementations operating in accordance with the technique described herein may act. It should be appreciated, however, that these computer systems are merely illustrative of the types of computer systems in which implementations operating according to the technique may act and that any suitable computer system may be used.

It should be appreciated that various aspects of the technique may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in managing object deletion in a storage system comprising a server component communicatively coupled to communicate with one or more clients of the storage system and communicatively coupled to manage a storage array component comprising a disk array, the method comprising:

the server component repeatedly polling the storage array component for updated information about the storage system;

at the server component, receiving an information set from the storage array component as part of the updated information received as a result of the repeated polling, the information set identifying an object to be deleted from a system management model that is descriptive of the storage system;

in response to receiving the information set, applying an iterative process to determine other objects in the system management model that are affected by deletion of the object, the other objects being unidentified in the information set;

and automatically deleting the object from the system management model, wherein the acts of polling, receiving, applying and deleting are performed autonomously by the server component, independently of any communication initiating performance of such acts from the one or more clients or any users or other entities, wherein the server component comprises a first provider of services, and the storage array component comprises an operating system and an interface, wherein the interface derives the information set from information received from the operating system, and wherein the first provider receives the information set from the interface and initiates the iterative process.

2. The method of claim 1, wherein the object is maintained in an environment in which relationships in the form of hierarchies and dependencies are formed between objects to allow managed objects to be represented.

3. The method of claim 1, wherein a relationship matrix between managed objects is maintained when the object is deleted.

4. The method of clam 1, wherein the object deletion takes into account managed object hierarchies including a parent/child relationship.

5. The method of claim 1, further comprising: automating deletion of the object by executing a prune procedure.

6. The method of claim 1, further comprising: receiving a key identifying the object; and using the key in the iterative process.

7. The method of claim 1, further comprising: using information in the object in the iterative process to determine other objects in the system management model that are affected by deletion of the object.

8. The method of claim 1, further comprising: invoking a prune operation of the object; and completing the prune operation before deleting the object.

9. The method of clam 1, further comprising: invoking a prune operation of the object; and based on the prune operation, invoking another prune operation of another object.

10. The method of claim 1, further comprising: using, in a deterministic way before the object is deleted, information in the object about another object owned by the object and a prune operation of the object, to reflect the deletion.

11. The method of claim 1, further comprising: building a hash table from type and key information for the object; and determining by using object type as a hash key, a fundamental child object affected by the deletion of the object.

12. The method of claim 11, further comprising: removing the child object; and removing another child object that should no longer exist absent a reference to the child object that was removed.

13. A storage system for use in managing object deletion, the storage system comprising:
a storage array component comprising a storage array;
and a server component communicatively coupled to manage the storage array component and communicatively coupled to communicate with one or more clients of the storage system, and executed by a processor to:
repeatedly poll the storage array component for updated information about the storage system;
receive an information set from the storage array component as part of the updated information received as a result of the repeated polling, the information set identifying an object to be deleted from a system management model that is descriptive of the storage system;
in response to receiving the information set, apply an iterative process to determine other objects in the system management model that are affected by deletion of the object, the other objects being unidentified in the information set; and automatically delete the object from the system management model,
wherein the server component is operative to perform the acts of polling, receiving, applying and deleting autonomously, independently of any communication initiating performance of such acts from the one or more clients or any users or other entities,
wherein the server component comprises a first provider of services, and the storage array component comprises an operating system and an interface, wherein the interface is operative to derive the information set from information received from the operating system, and wherein the first provider is operative to receive the information set from the interface and initiates the iterative process.

14. The system of claim 13, wherein the object is maintained in an environment in which relationships in the form of hierarchies and dependencies are formed between objects to allow managed objects to be represented.

15. The system of claim 13, wherein a relationship matrix between managed objects is maintained when the object is deleted.

16. The system of claim 13, wherein the object deletion takes into account managed object hierarchies including a parent/child relationship.

17. The system of claim 13, wherein the server component is further configured with logic to:
automate deletion of the object by executing a prune procedure.

18. The system of claim 13, wherein the server component is further configured with logic to:
automate deletion of the object by executing a purge procedure.

19. The method of claim 1, wherein applying the iterative process comprises:
invoking a first operation on the object, the first operation comprising:
invoking a second operation on the object;
and deleting the object after completion of the second operation on the object,
wherein invoking the second operation comprises:
the determining of the objects, and for each of the determined objects, invoking the first operation on the determined object.

* * * * *